(12) United States Patent
Popescu et al.

(10) Patent No.: US 9,454,809 B2
(45) Date of Patent: Sep. 27, 2016

(54) PHASE DERIVATIVE MICROSCOPY MODULE HAVING SPECIFIED AMPLITUDE MASK

(71) Applicant: The Board of Trustees of the University of Illinois, Urbana, IL (US)

(72) Inventors: Gabriel Popescu, Champaign, IL (US); Taewoo Kim, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 299 days.

(21) Appl. No.: 13/776,037

(22) Filed: Feb. 25, 2013

(65) Prior Publication Data
US 2014/0085713 A1    Mar. 27, 2014

Related U.S. Application Data

(60) Provisional application No. 61/705,377, filed on Sep. 25, 2012.

(51) Int. Cl.
*G02B 21/36* (2006.01)
*G06T 5/00* (2006.01)

(52) U.S. Cl.
CPC ............... *G06T 5/007* (2013.01); *G02B 21/36* (2013.01); *G02B 21/361* (2013.01)

(58) Field of Classification Search
None
See application file for complete search history.

(56) References Cited

U.S. PATENT DOCUMENTS

| | | | |
|---|---|---|---|
| 6,859,318 B1* | 2/2005 | Mossberg | 359/569 |
| 2006/0258018 A1* | 11/2006 | Curl et al. | 436/180 |
| 2009/0290156 A1 | 11/2009 | Popescu et al. | 356/338 |
| 2010/0142014 A1* | 6/2010 | Rosen et al. | 359/1 |
| 2012/0262562 A1* | 10/2012 | Fukutake | G02B 21/367 348/79 |

OTHER PUBLICATIONS

Kim et al., "Laplace field microscopy for label-free imaging of dynamic biological structures," *Opt. Lett.*, vol. 36, No. 23, pp. 4704-4706 (Dec. 2011).
Kim et al., "Gradient field microscopy of unstained specimens," *Opt. Exp.*, vol. 20, No. 6, pp. 6737-6745 (Mar. 2012).
McIntyre et al., "Differential interference contrast imaging using a spatial light modulator," *Opt. Lett.*, vol. 34, No. 19, pp. 2988-2990 (Oct. 2009).
Wang et al., "Spatial light interference microscopy (SLIM)," *Opt. Exp.*, vol. 19, No. 2, pp. 1016-1026 (Jan. 2011).
Wang et al., "Label-free intracellular transport measured by spatial light interference microscopy," *J. Biomed. Opt.*, vol. 16, No. 2, pp. 026019-1-026019-9 (Feb. 2011).

\* cited by examiner

*Primary Examiner* — Stephone B Allen
*Assistant Examiner* — Ryan S Dunning
(74) *Attorney, Agent, or Firm* — Sunstein Kann Murphy & Timbers LLP (57) ABSTRACT

Methods and a module for use with a microscope for enhancing image contrast in an image of a phase object. A transmission image of a specimen is formed in an image plane, of which a Fourier transform is generated in a Fourier plane. An amplitude filter is applied to the Fourier transform field, which is then transformed back to an image at a focal plane of a detector array. An image signal from the detector array is processed to generate a contrast-enhanced image of the specimen.

6 Claims, 6 Drawing Sheets

PHASE DERIVATIVE MICROSCOPY MODULE HAVING SPECIFIED AMPLITUDE MASK

The present application claims priority of U.S. Provisional Patent Application Ser. No. 61/705,377, filed Sep. 25, 2012, and incorporated herein by reference.

This invention was made with government support under Grants CBET 08-46660 Career, and CBET 1040462 MRI, awarded by the National Science Foundation, and R21 CA147967-01, awarded by the National Cancer Institute. The Government has certain rights in the invention.

TECHNICAL FIELD

The present invention relates to apparatus and methods for enhancing image contrast in label-free imaging of substantially transparent specimens.

BACKGROUND ART

Unlabeled cells and tissues are transparent under visible light and, as such, can be approximated as phase objects, with a transmission function of the form $t(x, y) \cong A \exp[i\phi(x, y)]$. That is to say that an intensity image, as rendered by a bright field microscope, loses the phase information and yields negligible contrast, since the intensity is the square modulus of the amplitude, which is to say that it is independent of $\phi(x, y)$. Much of light microscopy's four-century history has been shaped by the quest to develop new contrast mechanisms. Generating exogenous contrast requires designing new chemical compounds (e.g., dyes, fluorophores, nanoparticles) that bind to particular structures of interest and also absorb, emit, or scatter light significantly, basically converting the structure from a phase to an amplitude object.

On the other hand, intrinsic contrast methods exploit the light-tissue interaction in such a way as to couple the information carried by the phase into the final intensity image. These techniques do not aim to provide quantitative information about the optical thickness of the specimen. Instead, they provide non-invasive, label-free access to microscopic structures of cells and tissues, without the restrictions associated with exogenous contrast agents. While a number of methods utilizing intrinsic contrast have been proposed in recent years, the most commonly used label-free methods are phase contrast (PC) microscopy and differential interference contrast (DIC) microscopy, both of which have played major roles in biological investigations over the course of several decades.

A drawback of the forgoing methods is that each suffers from optical artifacts: halos in the case of PC, and directional shadows, in the case of DIC. In particular, DIC provides an intensity image that is related to the gradient of the field. Thus, using birefringent optics, two identical replicas of the image field, slightly shifted transversely, are produced at the observation plane, $$I(x, y) = A|e^{i\phi(x,y)} + e^{i[\phi(x+\delta x, y)+\alpha]}|^2 \qquad (1)$$
$$= 2A\{1 + \cos[\delta\phi_x(x, y) + \alpha]\}.$$

In Eq. 1, I is the image intensity, $\phi$ the phase of the object, $\delta x$ is the transverse shift between the two images, $\alpha$ is a controllable phase shift between the two fields, and the phase shift between the two fields, $\delta\phi$, is proportional to the one-dimensional gradient of the phase $\phi$, $$\delta\phi_x(x, y) = \phi(x + \delta x, y) - \phi(x, y) \qquad (2)$$
$$\propto \frac{\partial \phi(x, y)}{\partial x}.$$

DIC derives its power in revealing fine details in the specimen by virtue of the fact that adjusting $\alpha$ to a value of $-\pi/2$, transforms the cosine in Eq. 1 into a sine, which, in the limit of small values of $\delta\phi$, becomes proportional to the one-dimensional gradient of the phase, since $\sin[\delta\phi_x(x, y)] \cong \delta\phi_x(x, y)$. Insofar as DIC is highly sensitive to edges, it renders beautiful images of fibrous structures, for example. However, its limitation comes from the fact that the first order derivative changes sign rapidly across an edge, thereby generating spurious bright and dark regions ("shadowing") along the direction of the gradient.

Use of grating as a diffractive optical element (DOE) for filtering at the back focal plane of an objective of a bright field microscope has been demonstrated by McIntyre et al., *Differential interference contrast imaging using a spatial light modulator, Opt. Lett.*, vol. 34, pp. 2988-90 (2009) by taking the two first-order diffracted field, shifted, by two different distances, from the DC field, due to two different grating periods.

Spatial Light Interference Microscopy (SLIM) is a modality that provides quantitative phase imaging (QPI), distinguishing it as a technique with respect to PC and DIC, both of which provide only qualitative phase images of phase objects. SLIM is described, for example, in US Published Patent Application 2009/0290156 (to Popescu et al.) and by Wang et al., *Spatial Light Interference Microscopy (SLIM), Opt. Exp.*, 19, pp. 1016-26 (2011), both of which are incorporated herein by reference. SLIM acquires an image of the quantitative phase delay of the optical path through the specimen albeit at the price in time and computation of successively interposing known phase delays with respect to a reference beam. Wang et al., *Label-free intracellular transport measured by spatial light interference microscopy, J. Biomed. Opt.*, 16, 026019 (2011), incorporated herein by reference, describes benefits of applying a Laplace derivative operator to the digital data derived from the SLIM imaging technique, in particular, a highlighting of detail without introducing gradient artifacts at edges.

A method for highlighting fine detail in phase images without incurring the spurious shadowing that arises in DIC, and without the temporal delay and computational overhead of SLIM, would thus be highly desirable.

SUMMARY OF EMBODIMENTS OF THE INVENTION

In accordance with embodiments of the invention, apparatuses and methods are provided for enhancing image contrast in an image of a phase object. In one embodiment, a phase derivative module is provided that has a first lens for creating, in a Fourier plane, a field corresponding to a 2D spatial Fourier transform in a spatial frequency domain of an image field of a sample. The phase derivative module also has an amplitude mask disposed in the Fourier plane that is characterized by a transmission amplitude such that a subsequent Fourier transform of the transmitted field results in a function of the image field of the sample having a term proportional to a power of a derivative of the phase image field. A second lens transforms the transmitted field back to an image domain at a focal plane of a detector array.

In other embodiments of the invention, the amplitude mask may be a sine function in one direction of the spatial frequency domain, or may be radially symmetric and proportional to radius in the spatial frequency domain.

In a further embodiment of the invention, the amplitude mask may be substantially parabolic as a function of radius with respect to a central axis, thereby constituting a Laplace field module.

In yet a further embodiment, the amplitude mask may be linear as a function of radius with respect to a central axis, thereby constituting a gradient field module. In a further embodiment yet, the amplitude mask may be a one-dimensional sinusoidal function, thereby constituting another version of a gradient field module.

More particularly, the amplitude mask may be generated by a spatial light modulator.

In an alternate embodiment of the present invention, a phase derivative microscope is provided that has a source of an illuminating beam for illuminating a specimen, an objective lens for collecting light from the source transmitted through the specimen and forming an image at an output port, and a phase derivative module for transforming the image and for filtering a transform of the image.

In accordance with another aspect of the present invention, a method is provided for enhancing image contrast in an image of a phase object, wherein the method has steps of
a. forming a transmission image of a sample in an image plane;
b. forming a Fourier transform field, in a spatial frequency domain, of the transmission image in a Fourier plane;
c. applying an amplitude filter to the Fourier transform field;
d. transforming the Fourier transform field back to an image at a focal plane of a detector array;
e. detecting the image to generate an image signal; and
f. processing the image signal to generate an contrast-enhanced image of the phase object.

In other embodiments of the invention, the step of forming the transmission image may include illuminating the phase object with substantially spatially coherent illumination. Applying an amplitude filter may be performed by means of a spatial light modulator. The amplitude filter may be sinusoidal along a direction in the spatial frequency domain, or substantially proportional to radius in the spatial frequency domain, or a substantially parabolic function of radius in the spatial frequency domain.

BRIEF DESCRIPTION OF THE DRAWINGS

The foregoing features of the invention will be more readily understood by reference to the following detailed description, taken with reference to the accompanying drawings, in which:

FIG. 2A shows a polystyrene bead of 3-μm diameter immersed in oil as imaged under blight field illumination, while

DETAILED DESCRIPTION OF EMBODIMENTS OF THE INVENTION

Definitions

The term "image" shall refer to any multidimensional representation, whether in tangible or otherwise perceptible form, or otherwise, whereby a value of some characteristic (amplitude, phase, etc.) is associated with each of a plurality of locations corresponding to dimensional coordinates of an object in physical space, though not necessarily mapped one-to-one thereon. Thus, for example, the graphic display of the spatial distribution of some field, either scalar or vectorial, such as brightness or color, constitutes an image. So, also, does an array of numbers, such as a 3D holographic dataset, in a computer memory or holographic medium. Similarly, "imaging" refers to the rendering of a stated physical characteristic in terms of one or more images.

As used herein, "label-free" refers to a method of imaging a substantially transparent sample that does not require introduction of materials, such as fluorophores or contrast agents that are extrinsic to the imaged sample.

The terms "object," "sample," and "specimen" shall refer, interchangeably, to a tangible, non-transitory physical object capable of being rendered as an image.

The term "differential phase method" shall refer to any imaging method in which the intensity of an image is a function (typically linear) of the gradient of an optical phase, without regard for the mechanism by which this effect is achieved.

The term "high numerical aperture" shall characterize an optical element of numerical aperture (NA) exceeding 0.1, such that approximations based on NA<<1 are inapplicable.

The term "substantially high spatial coherence" as applied to a beam of light shall denote a condition of coherence wherein if two slits were to be placed within the beam in a plane transverse to the beam propagation axis, at least one interference null would result in the far field where the intensity is no greater than 10% of the peak intensity of the beam.

The term "broadband" as applied to a source of irradiation shall refer to a source for which $\Delta k/k_0$ is at least 10%, with $k_0$ denoting the central wavenumber of the spectrum illuminating the sample, while $\Delta k$ denotes the range of illuminating wavenumbers. It is to be understood that, within the scope of the present invention, the wavelength of the source may be swept in time, and that concurrent broadband illumination and post-dispersion detection is employed in preferred embodiments of the invention.

In accordance with embodiments of the present invention, novel differential phase methods are provided that conserve the benefits of DIC, rendering high contrast images of transparent specimens, while, at the same time, reducing or eliminating the presence of shadows that typically arise across edges along the direction of the gradient. The novel differential phase methods described herein comprise a class of methods for rendering an image at the focal plane of a detector in which at least a component of the field incident on a detector is proportional to a derivative of the phase of the field transmitted through the sample.

One such method, which may be referred to as "gradient field microscopy" (GFM), is based on spatial filtering of light at the back focal plane of the objective. Like DIC, GFM provides the first-order derivative of the phase, however GFM overcomes two notable limitations of conventional DIC, namely the directional shadow artifact and the inapplicability of DIC to birefringent samples. The former obstacle is overcome by measuring the gradient amplitude (intensity) rather than one of its components, while the second former obstacle is overcome by using spatial light modulation without polarizing optics to achieve interference between two shifted replicas of the image field. A further method referred to as Laplace field microscopy (LFM) will also be described.

The general class of phase derivative microscopy techniques taught in the present invention is initially described with reference to FIGS. 1A-1D. One apparatus for implementing GFM or LFM is designated generally by numeral 100 in FIG. 1A, and is referred to herein as a phase derivative microscope. One or more portions of the gradient field microscope may be provided by a prior art inverted bright field microscope 102, the components of which need not be modified. In addition to inverted microscope 102, a phase derivative module (which may be a gradient field module, alternatively, "GFM module", for example, or a Laplace field module, for another example), designated generally by numeral 120, comprises a portion of the phase derivative microscope, as will be described in detail below.

White light from a source 104, such as a halogen lamp, is spatially filtered by a spatial filter such as pinhole 106 to achieve substantially high spatial coherence (as defined above). The subsequently collimated field 108 is used for illuminating a specimen 110 in transmission. Light transmitted through the specimen is collected by an objective 112 and an image of the specimen is formed at the output port 121 via a tube lens TL. The GFM module 120 consists of a 4f imaging system, an optical configuration described, for example, by Goodman, *Introduction to Fourier Optics*, (3d ed., 2005), at page 232, where the entire book is incorporated herein by reference. GFM module 120 contains an amplitude mask 130, 131, 132 (shown in FIGS. 1B-1D) at Fourier plane 124. Lens $L_1$ generates a two-dimensional (2D) spatial Fourier transform $\tilde{U}(k_x, k_y)$ of the image field $U(x, y)$. Achromatic doublets are preferably employed to avoid color aberrations.

Amplitude mask 130, 131, 132 is an amplitude filter that modifies the amplitude of a field transmitted through the mask such that a subsequent Fourier transform of the transmitted field results in a function of the image field of the sample having a term proportional to a power of a derivative of the phase image field. Amplitude mask 130 is disposed at Fourier plane 124, and may be conveniently implemented by an amplitude-only spatial light modulator (SLM), such as a liquid crystal SLM. In one embodiment of the present invention, a liquid crystal SLM obtained from an Epson Powerlite S5 projector was employed, characterized by a contrast ratio of 400/1 and a pixel size of 13 μm.

Even though the illumination is preferably broadband, the autocorrelation of the field may be characterized by a well-defined modulation (mean) frequency, with respect to which the Fourier transform is well defined.

Figure 1A:
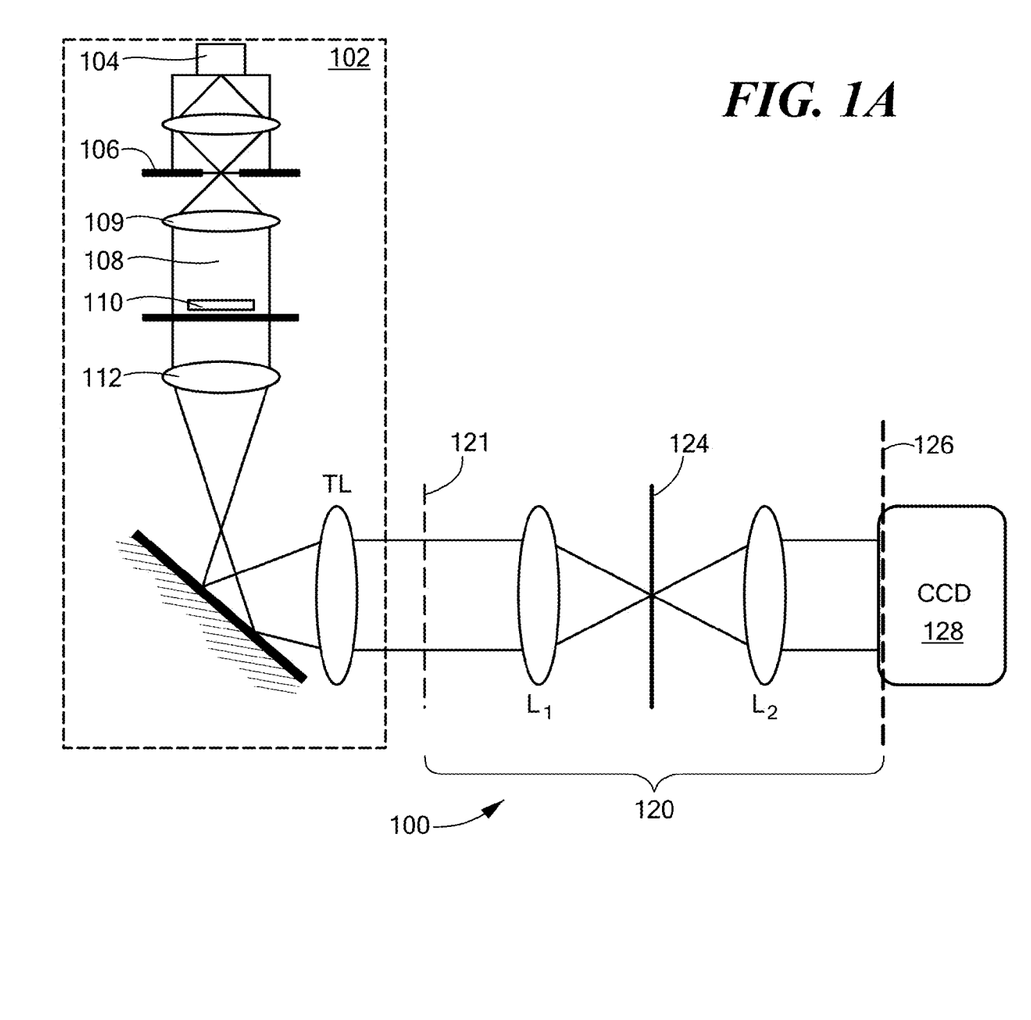
FIG. 1A is a schematic depiction of a gradient field microscope in accordance with an embodiment of the present invention, incorporating a phase derivative module image with a transmission mask of one of a variety of intensity profiles as shown, for example, in FIGS. 1B-1D.
Figure 1B:
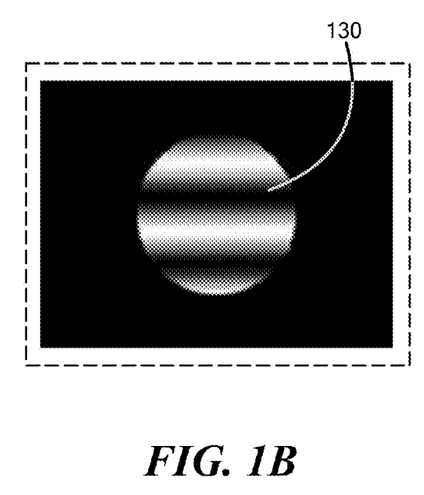
Figure 1C:
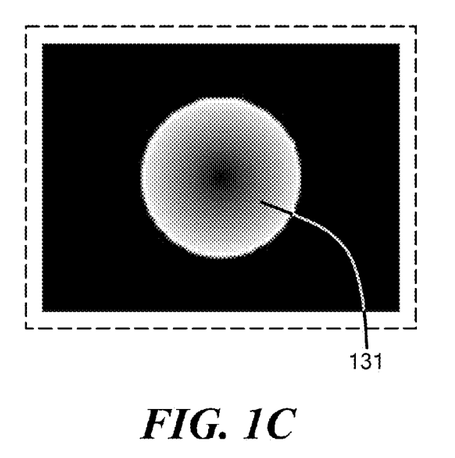
Figure 1D:
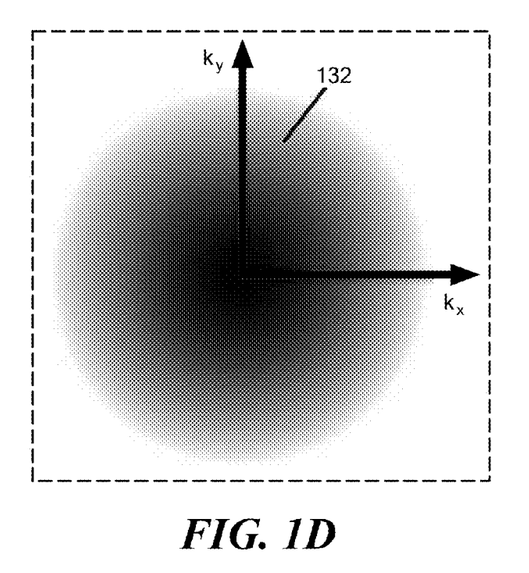

In certain embodiments of the invention, modulation patterns may be applied to amplitude mask 130, 131, 132 as shown in FIGS. 1B-1D. The pattern shown in FIG. 1B provides a one-dimensional phase derivative, while the pattern in FIG. 1C provides gradient intensity (bottom). The modulation of amplitude mask 130 in FIG. 1B is a sine function in the y-direction of the spatial frequency domain, $H(k_x, k_y)=A[1+\sin(\alpha k_y)]$. This modulation generates two shifted duplicates of the field, which then interfere and form the first-order derivative of the field as:

$$[1+\sin(ak_y)]U(k_x,k_y) \leftrightarrow \left[\delta(x,y)+\frac{\delta(x,y-a)-\delta(x,y+a)}{2i}\right]* \quad (3)$$
$$U(x,y)=U(x,y)+ia\frac{\partial U(x,y)}{\partial y}.$$

In the foregoing Eq. (3), $\alpha$, $k_{x,y}$, and $U(x,y)$ are the inverse period of the sine modulation, spatial frequencies in x and y direction, and the scattered field at the image plane of microscope 102, respectively. Therefore, for a purely phase object (of unit amplitude), $U(x, y)=\exp[i\phi(x, y)]$, the first order derivative of the phase $\phi(x,y)$ is obtained at the image plane 126 along with some additive DC component.

$$I(x,y) = \left|e^{i\phi(x,y)} - a\frac{\partial \phi(x,y)}{\partial y}e^{i\phi(x,y)}\right|^2 \approx 1 - 2a\frac{\partial \phi(x,y)}{\partial y} \quad (4)$$

In Eq. (4), $I(x,y)$ and $\phi(x,y)$ represent the measured intensity at the detector and the phase of the scattered field, respectively. As shown in Eq. (4), this sine-modulation GFM gives the identical result as the regular DIC. Note that, unlike in DIC, where birefringent prisms are used to generate the two interfering beams, GFM operates without polarization optics. Thus, the GFM module 120 can be used with a regular bright field microscope 102, without the need for specialized optics.

Use of a sinusoidal mask 130 as shown in FIG. 1B may be called sine-GFM, and, relative to the use of a diffractive optical element as taught by McIntyre (2009), exhibits lower loss of light, since it uses the DC component and the positive and negative shifted first-order diffracted fields. Consequently, this advantage enables sine-GFM to be used with shorter exposure time which provides the ability to measure dynamic specimens. Furthermore, the use of white light instead of a laser reduces speckle and provides higher resolution in the images.

Referring now to FIG. 1C, the intensity of the gradient may be obtained by using a "cone-like" filter shape, $H(k_x, k_y)=(k_x^2+k_y^2)^{1/2}=|k_r|$, with transmission proportional to a radius in the spatial frequency domain, as depicted in amplitude mask 131 shown in FIG. 1C The measurement at the detector yields the square of the first-order derivative of the phase as $$I(r) = |FT[|k_r|U(k_r)]|^2 \approx \left|\frac{\partial \phi(r)}{\partial r}\right|^2, \quad (5)$$

where I is the intensity measured by CCD 128 at image plane 126. The advantage of this linear modulation is that there is no directional shadow artifact that occurs in DIC due to the rapidly changing sign of the derivative. However, in Eq. (3), the derivative image obtained from this linear modulation assumes that the field is rotationally symmetric. The image may be degraded for specimens without such symmetry. Thus, in practice, one can chose between the two complementary methods (sine- and linear-GFM) according to the properties of the sample, or combine multiple modes of GFM to obtain the full vector gradient of the phase of the sample, e.g. combining two sine-GFM images with shifts in different directions.

Referring now to FIG. 1D, in certain other embodiments of the invention, amplitude filter 132 is of a substantially parabolic form, $H(k_x, k_y)=\alpha(k_x^2+k_y^2)$, with $\alpha$ denoting a constant. The DC component of the scattered light is strongly attenuated through this parabolic filter, while the scattered AC component experiences progressively less attenuation toward higher frequencies. As will be shown below, this form of amplitude filter 132 yields a Laplacian of the phase of the field transmitted through the sample, and, in this case, module 120 may be referred to as a Laplace Field Module.

The SLM pixel size (p=13 μm) limits the resolution in k-space, δk, and, thus, the field of view at the image plane over which the modulation produced by one SLM pixel is uniform. In one embodiment of the invention, $\delta k=k_0 p/f$, where p is the pixel size, $k_0=2\pi/\lambda$ is the wavenumber characterizing the mean frequency of the illumination, and f=150 mm is the focal length of lens $L_2$. While the corresponding field of view in the image plane is of the order of $2\pi/\delta k \sim 6.25$ mm, high contrast images were successfully obtained over the entire CCD, which is larger, 13 mm on the side.

Lens $L_2$ Fourier transforms the field back to the image domain, such that at the focal plane of detector 128 (where detector 128 may be a charge-coupled device (CCD) or other detector) the field is:

$$U_i(x,y)=\alpha\Im[(k_x^2+k_y^2)\tilde{U}(k_x,k_y)]=-\alpha\nabla^2 U(x,y) \quad (3)$$

Thus, for phase objects (i.e., $U(x,y) \cong A \exp[i\phi(x,y)]$), under the Born approximation, the intensity image reveals directly the first and second order derivatives of the phase itself. Thus, the intensity distribution $I(x,y)=|U_i(x,y)|^2$ recorded at the CCD detector plane, is thus proportional to:

$$I(x,y) \propto [\nabla^2 \phi(x,y)]^2 + \left[\left(\frac{\partial \phi(x,y)}{\partial x}\right)^2+\left(\frac{\partial \phi(x,y)}{\partial y}\right)^2\right]^2. \quad (4)$$

The foregoing equation establishes that LFM reveals high contrast images from entirely transparent (phase) structures.

Example

Polystyrene Beads Immersed in Oil

Figure 2A:
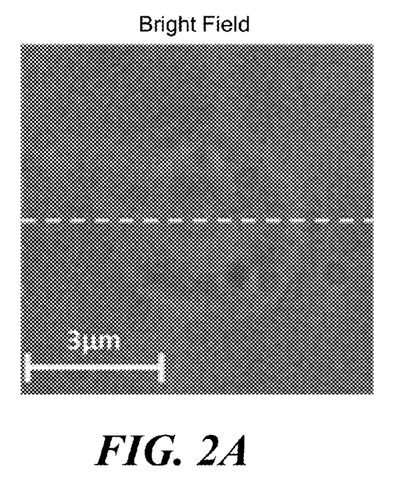
Figure 2B:
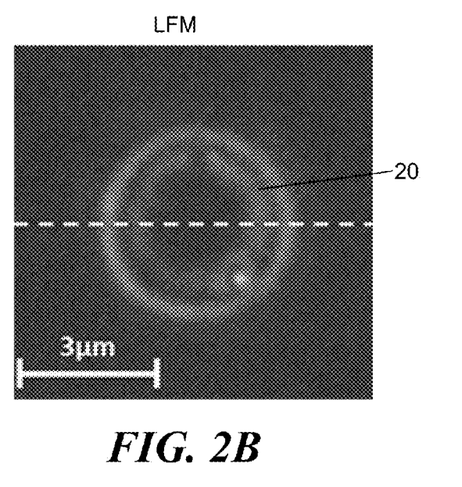
FIG. 2B shows the same bead imaged by a Laplace field microscope in accordance with an embodiment of the present invention.
Figure 2C:
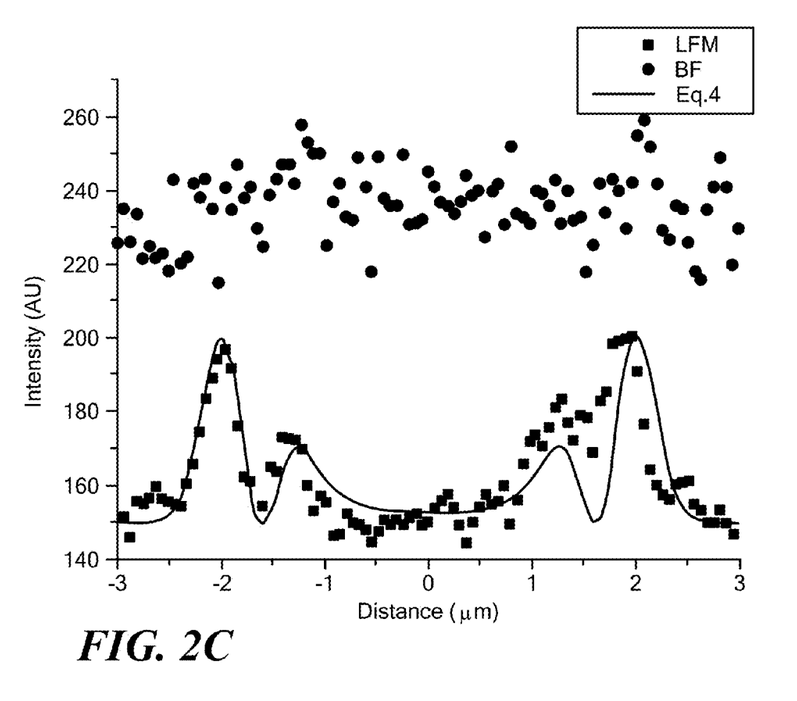
FIG. 2C plots the intensity of a slice across the bead of FIGS. 2A and 2B along with a calculation of the field resulting from operation of a Laplacian operator.

As one example of the capability of LFM, 3-μm polystyrene beads immersed in oil were first imaged under bright field illumination (a shown in FIG. 2A), exhibiting low contrast. When the parabolic amplitude filter 132 was turned on, the contrast of bead 20 increased significantly, as illustrated in FIGS. 2B-2C. FIG. 2C plots profiles through the two images, 2A (above) and 2B (below). The solid line plot in FIG. 2C employs Eq. 4 particularized for the case of the spherical particle, where the phase shift is $\phi(x)=2k_0[R^2-x^2]^{1/2}$, with R the particle radius, x the horizontal distance from the bead center, and $k_0=2\pi/\lambda$ is the wavenumber characterizing the mean frequency of the illumination. In order to fit the experimental profile and also include the effects of finite resolution, the phase shift function representing the propagating field with a Gaussian function of root-mean-square (rms) width given by the diffraction limit was convolved at the outset. In the experimental setup described herein, the diffraction limit is $\lambda/2NA=0.2$ μm, where NA is the numerical aperture of the system, and $\lambda=0.53$ nm is the mean illuminating wavelength. Note that the derivatives in Eq. 4 associated with this phase distribution diverge at $x=\pm R$, thus, the convolution integral was performed in a principle value sense, avoiding the singularity points. Using this new phase profile, Eq. 4 was numerically evaluated as plotted in FIG. 2C. The second order derivative (curvature) of the phase takes the significant role in this spherically shaped object case. This profile clearly shows that LFM is very sensitive to edges, without introducing directional artifacts that typically plague DIC. On the other hand, the bright field image plotted above in FIG. 2C shows a flat profile, indicating low contrast, as expected.

Example

Tissue Sections

Figure 3A:
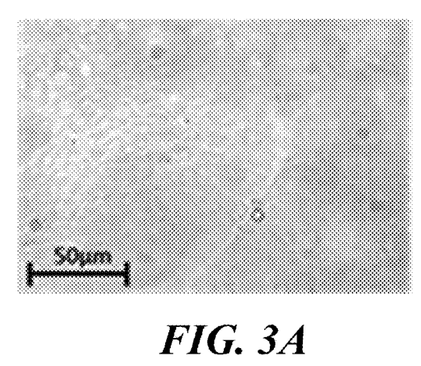
FIGS. 3A and 3B show bright field, and LFM images, respectively, of a gut section.
Figure 3B:
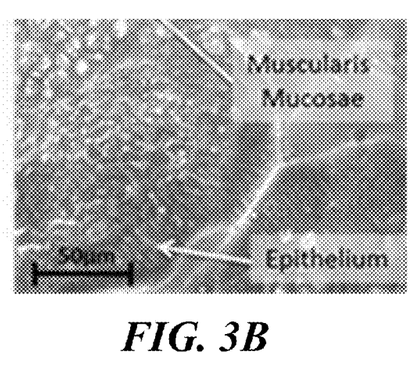
Figure 3C:
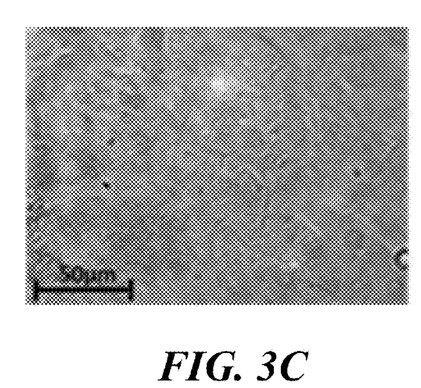
FIG. 3C is a semilog histogram of FIGS. 3A and 3B.
Figure 3D:
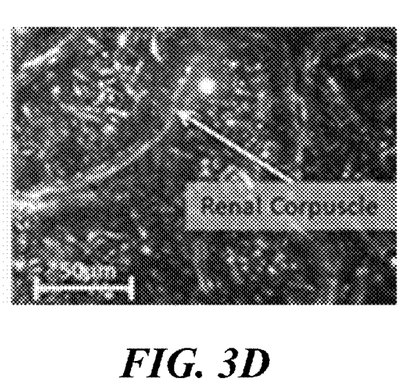
FIGS. 3D and 3E show bright field, and LFM images, respectively, of a kidney section.
Figure 3E:
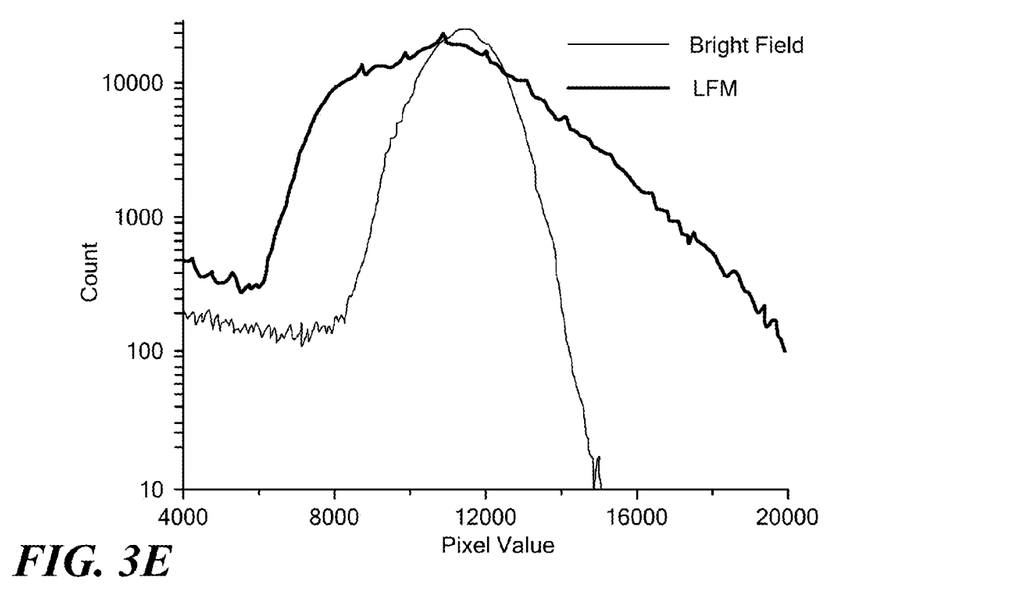
Figure 3F:
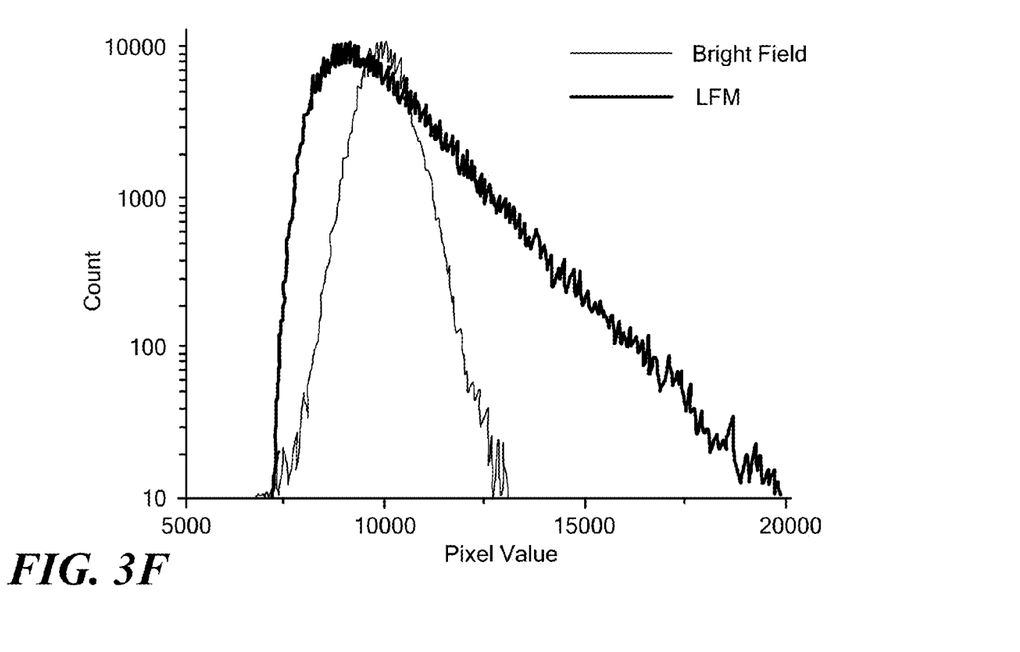
FIG. 3F is a semilog histogram of FIGS. 3D and 3E.

LFM can be used to study unstained tissues sections. FIGS. 3A and 3B show a side-by-side comparison of bright field and LFM images obtained from the same field of view of a gut section, while FIGS. 3C and 3D show a side-by-side comparison of bright field and LFM images obtained from the same field of view of a kidney section. The gain in contrast using LFM is significant and allows distinction of specific morphologic structures that are typically studied using various stains. The gain in contrast is well represented by the intensity histograms of FIGS. 3E and 3F, which clearly become much broader in LFM than in bright field.

An important feature of LFM is that the rate of image acquisition is limited only by the camera frame rate. Thus, LFM is well suited for studying highly dynamic specimen such as cells. A particularly advantageous application of the apparatus and methods described herein lies in studying dynamics using certain derivatives of the spatial phase distribution rather than the quantitative phase image itself. It has been shown by Popescu, *Quantitative phase imaging of cells and tissues*, Chap. 15, (McGraw-Hill, New York, 2011), incorporated herein by reference, that since the optical pathlength contains information about both thickness and refractive index of the specimen, quantitative phase imaging is capable of investigating both out-of-plane cell membrane fluctuations (using the thickness component) and in plane intracellular transport (using the refractive index component).

The data analysis is based on the dispersion relation that connects the temporal and spatial frequencies of the fluctuations. This relation is obtained directly from the differential equations that govern the motions (e.g., the diffusion equation in the case of Brownian particle transport). This means that, for studying dynamics, the phase shift need not be known quantitatively; rather, one of its derivatives is sufficient. For example, the spatial power spectrum of the pathlength fluctuations can be obtained from the power spectrum of the Laplacian, by simply multiplying with $k^2$. LFM and similar approaches advantageously allow for novel investigations of dynamic systems, while bringing great simplifications in the optical setup.

Further description of embodiments of the invention may be found in Kim, et al., *Gradient field microscopy of unstained specimens, Opt. Exp.*, vol. 20, pp. 6737-45 (2012), which is incorporated herein by reference.

Example

HeLa Cells

Figure 4A:
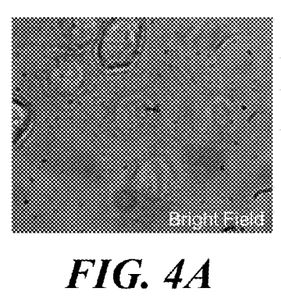
FIGS. 4A-4C show bright field, GFM with linear modulation and GFM with sine modulation, respectively, of a HeLa cell culture.
Figure 4B:
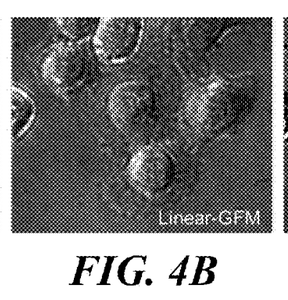
Figure 4C:
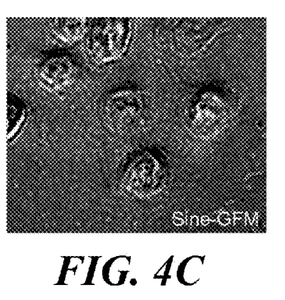
Figure 4D:
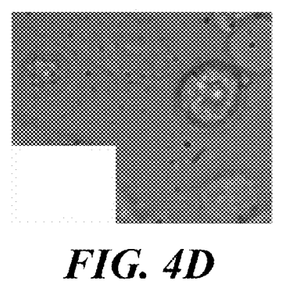
FIG. 4D-4I show GFM with sine modulation at different sine period of a HeLa cell culture.
Figure 4E:
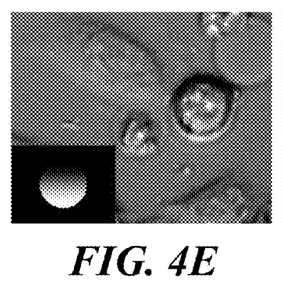
Figure 4F:
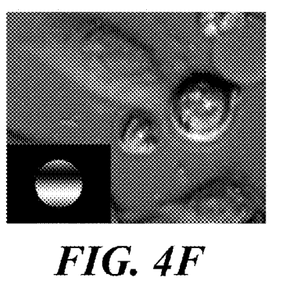
Figure 4G:
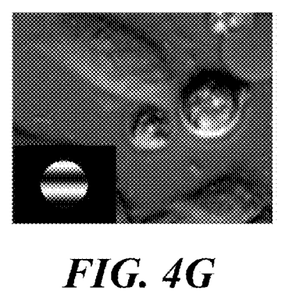
Figure 4H:
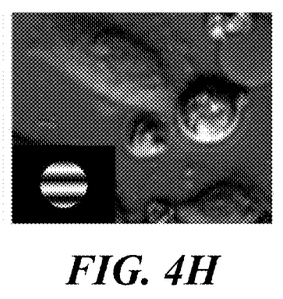
Figure 4I:
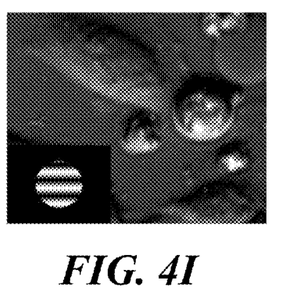

Because of its fast acquisition speed, GFM is suitable for studying live cells. FIGS. 4A, 4B, and 4C show bright field, GFM with linear function, and GFM with sine function, respectively, of a HeLa cell culture. It is evident that the two version of GFM shows much higher contrast than the bright field image. FIGS. 4D-I show GFM with sine function at different sine periods of a HeLa cell culture. As the modulation period changes, different structures in the sample are emphasized. For large period modulations, smaller features of the sample are emphasized and for small period modulations, larger features of the sample are emphasized.

In preferred embodiments of the present invention, the disclosed methods for phase derivative microscopy may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A phase derivative module comprising:
   a. a first lens for creating, in a Fourier plane, a field corresponding to a 2D spatial Fourier transform in a spatial frequency domain of an image field of a sample;
   b. an amplitude mask disposed in the Fourier plane, the amplitude mask transmitting a transmitted field characterized by a central axis, the amplitude mask characterized by a transmission amplitude having a minimum value at the central axis such that a subsequent Fourier transform of the transmitted field results in a function of a phase component of the image field of the sample having a term proportional to a power of a derivative of the phase component of the image field;
   c. a second lens for transforming the transmitted field back to an image domain showing the derivative of the phase component at a focal plane of a detector array disposed at an image plane.

2. A phase derivative module in accordance with claim 1, wherein the amplitude mask is a sine function in one direction of the spatial frequency domain.

3. A phase derivative module in accordance with claim 1, wherein the amplitude mask is radially symmetric and proportional to radius in the spatial frequency domain.

4. A phase derivative module in accordance with claim 1, wherein the amplitude mask, the transmission of which is substantially proportional to the square of a radius with respect to a central axis, and the phase derivative module includes a Laplace field module.

5. A phase derivative module in accordance with claim 1, wherein the amplitude mask is generated by a spatial light modulator.

6. A phase derivative microscope comprising:
   a. a source of an illuminating beam for illuminating a specimen;
   b. an objective lens for collecting light from the source transmitted through the specimen and forming an image at an output port; and
   c. a phase derivative module in accordance with claim 1 for transforming the image and for filtering a transform of the image.

* * * * *